United States Patent [19]

Feeman et al.

[11] Patent Number: 4,749,784

[45] Date of Patent: Jun. 7, 1988

[54] ALKANOL SUBSTITUTED DISAZO ORANGE DYE FOR NYLON

[75] Inventors: James F. Feeman, Wyomissing; Jay E. Rowe, Douglassville, both of Pa.

[73] Assignee: Crompton & Knowles Corporation, New York, N.Y.

[21] Appl. No.: 13,162

[22] Filed: Feb. 10, 1987

Related U.S. Application Data

[63] Continuation of Ser. No. 710,413, Mar. 11, 1985, abandoned.

[51] Int. Cl.$^4$ .................... C09B 31/062; C09B 42/28; D06P 1/39; D06P 3/24
[52] U.S. Cl. .......................... 534/728; 8/641; 260/372; 534/582; 534/583; 534/596; 534/831; 534/859; 534/880; 534/887; 564/348
[58] Field of Search ................. 534/728, 831; 8/641

[56] References Cited

U.S. PATENT DOCUMENTS

| | | | |
|---|---|---|---|
| 3,594,363 | 7/1971 | Stingl | 534/831 X |
| 3,676,050 | 7/1972 | James | 534/831 X |
| 3,862,119 | 1/1975 | Stingl | 534/831 |
| 3,905,952 | 9/1975 | Speck | 534/831 X |
| 3,932,376 | 1/1976 | Feeman | 534/831 |
| 3,932,378 | 1/1976 | Fasciati | 534/831 |
| 3,963,418 | 6/1976 | Tullio | 534/831 X |
| 3,986,827 | 10/1976 | Dombchik | 534/831 X |
| 4,055,560 | 10/1977 | Dombchik | 534/728 X |
| 4,231,746 | 11/1980 | Dehnbert et al. | 534/831 X |
| 4,340,385 | 7/1982 | Rodriquez et al. | 534/831 X |

*Primary Examiner*—Floyd D. Higel
*Attorney, Agent, or Firm*—Synnestvedt & Lechner

[57] ABSTRACT

The specification describes a new group of alkanol substituted disazo compounds that are useful in dyeing polyamide textile fibers in orange hues. The new compounds are compatible with several acid blue dyes and several acid red dyes that are commercially important as dyes for nylon. The new compounds are particularly well suited for use as the "yellow" component in trichromatic systems for dying polyamide carpeting and other textiles. The new compounds are relatively inexpensive to make and have outstanding application and fastness properties. Other aspects of the specification are concerned with a method of making the new compounds and with a method of dyeing polyamides with said compounds and to the novel dyed polyamides resulting from the use of the new group of compounds as dyes.

18 Claims, No Drawings

ALKANOL SUBSTITUTED DISAZO ORANGE DYE FOR NYLON

This is a continuation of co-pending application Ser. No. 710,413 filed on Mar. 11, 1985, now abandoned.

This invention relates to a new group of compounds that are useful in the dyeing of polyamides, such as nylon, silk and wool, in orange hues. The new dyes are compatible with several acid blue dyes and several acid red dyes that are commercially important as dyes for nylon. They are particularly suited for use as the "yellow" dye component in trichromatic systems for dyeing polyamide carpeting and other fabrics. They are also relatively inexpensive to make, and they have outstanding application and fastness properties. Other aspects of the invention are concerned with a method of making the new compounds and with a method of dyeing polyamides with said compounds. Still other aspects of the invention are directed to the novel dyed polyamides resulting from the use of the new compounds as dyes.

The new compounds have the structure:

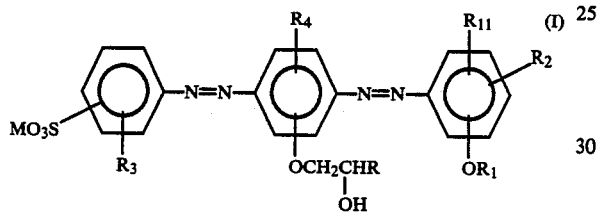

wherein
R is —H, —CH$_3$, —CH$_2$CH$_3$, —C$_6$H$_5$, or —CH$_2$OH;
R$_1$ is —H or R$_{16}$, wherein
R$_{16}$ is —CH$_3$, —CH$_2$CH$_3$, —CH$_2$CH$_2$OH,

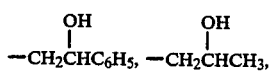

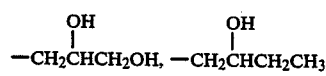

—SO$_2$ lower alkyl, —SO$_2$ phenyl, or —SO$_2$ phenyl substituted with one or more halo, lower alkyl, or lower alkoxy groups;
R$_2$ is —H, —lower alkyl, —lower alkoxy, or —Cl;
R$_3$ is —H, —lower alkyl, —lower alkoxy, or —Cl;

R$_4$ is —H, —CH$_3$, —CH$_2$CH$_3$, or
R$_{11}$ is —H or —lower alkyl;
M is —H, —Li, —Na, —K, NH$_4$, or —N(R$_5$)$_4$, wherein R$_5$ is —H or

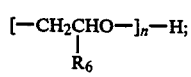

R$_6$ is —H, —CH$_3$, or —CH$_2$CH$_3$;
n is 1, 2, 3, or 4; and
OR$_1$ is ortho or para to the azo linkage, and when OR$_1$ is ortho to the azo linkage, a blocking group such as —lower alkyl, —lower alkoxy, or —Cl must be present para to the OR$_1$ group.

Throughout the following description and in the claims, unless the text clearly shows a different meaning intended, the terms R, R$_1$, R$_2$, R$_3$, R$_4$, R$_5$, R$_{16}$, R$_{11}$, R$_{16}$, M and n have the same meanings as in Structure I above. Where the terms "lower alkyl" or "lower alkoxy" are used, they refer to alkyl and alkoxy compounds having one to four carbon atoms.

The Structure I compounds wherein R$_1$ is —H, to wit:

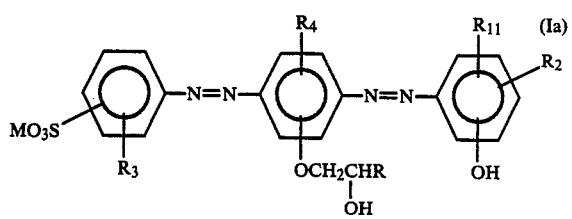

are useful as dyes for imparting orange hues to polyamide fibers; however, they generally exhibit some sensitivity to alkali. The Structure Ia compounds are also useful as precursors for making a large number of similarly structured compounds that have highly useful working properties when used as dyes for nylon and other polyamide fibers. These related compounds have enhanced alkali stability and are produced by "end capping" the Structure Ia compounds by any of the many well-known end capping techniques-for example, by replacing the terminal phenolic hydrogen with an alkyl, hydroxyalkyl, alkyl sulfonyl or aryl sulfonyl group to reduce alkali sensitivity and otherwise vary the working properties of the precursor compounds. For economic reasons, some of the preferred alkyl, hydroxyalkyl, alkyl sulfonyl, and aryl sulfonyl groups are the R16 substituents; they provide compounds of Structure Ib:

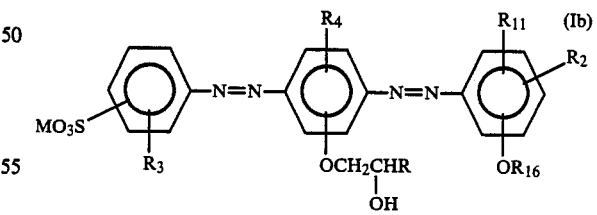

The Structure Ia compounds are prepared by sequential diazotization and coupling reactions, utilizing synthesis routes and techniques that are well understood in the art. More specifically, they are prepared by diazotizing a monosulfophenylamine having the desired R$_3$ substitution; coupling the resulting diazonium salt with a phenylamine which is capable of coupling in the para position (in relation to its amino group) and which has the structure:

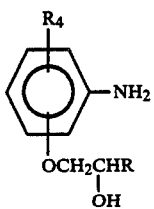

(II)

rediazotizing the monoazo compound; coupling the diazonium salt of the monoazo compound with a phenol having the desired $R_2$ and $R_{11}$ substitutions. The Structure Ib compounds are made from the Structure Ia compounds by reaction with a reagent capable of providing the desired $R_{16}$ substitution. The Structure I compounds can be formed as or converted to the desired salt form. For example, conversion to the free sulfonic acid form may be accomplished by treatment with a strong acid; this form may then be converted by treatment with a suitable base to give the desired M substitution.

As is also well known, in those cases where the Structure II phenylamine is insufficiently reactive to produce high yields of monoazo coupling when reacted with the monosulfophenylamine diazonium salt, the coupling reactivity may be enhanced by first converting the Structure II phenylamine to its corresponding methane sulfonate derivative by reacting it in a conventional manner with formaldehydebisulfite adduct and, following the first coupling, by removing the methane sulfonate group by basic hydrolysis to regenerate the primary amino group.

Suitable monosulfophenylamines for use in producing the new Structure I compounds include, but are not limited to:
2-aminobenzene sulfonic acid,
3-aminobenzene sulfonic acid,
4-aminobenzene sulfonic acid,
2-aminotoluene-5-sulfonic acid,
2-aminotoluene-4-sulfonic acid,
4-aminotoluene-3-sulfonic acid,
5-aminotoluene-2-sulfonic acid,
4-aminotoluene-2-sulfonic acid,
3-amino-4-methoxybenzene sulfonic acid,
4-amino-3-methoxybenzene sulfonic acid,
5-amino-2-methoxybenzene sulfonic acid,
3-amino-4-chlorobenzene sulfonic acid,
5-amino-2-chlorobenzene sulfonic acid, and
2-amino-5-chlorobenzene sulfonic acid.

Suitable Structure II phenylamines for use in producing the new Structure I compounds include, but are not limited to:
2-(2-aminophenoxy)ethanol,
1-(2-aminophenoxy)-2-propanol,
1-(2-aminophenoxy)-2-butanol,
2-(2-aminophenoxy)-1-phenylethanol,
2-(2-amino-4-methylphenoxy)ethanol,
1-(2-amino-4-methylphenoxy)-2-propanol,
1-(2-amino-4-methylphenoxy)-2-butanol,
2-(2-amino-4-methylphenoxy)-1-phenylethanol,
2-(2-amino-3-methylphenoxy)ethanol,
1-(2-amino-3-methylphenoxy)-2-propanol,
1-(2-amino-3-methylphenoxy)-2-butanol,
2-(2-amino-3-methylphenoxy)-1-phenylethanol,
2-(2-amino-6-methylphenoxy)ethanol,
1-(2-amino-6-methylphenoxy)-2-propanol,
1-(2-amino-6-methylphenoxy)-2-butanol,
2-(2-amino-6-methylphenoxy)-1-phenylethanol,
2-(2-amino-3-methoxyphenoxy)ethanol,
1-(2-amino-3-methoxyphenoxy)-2-propanol,
1-(2-amino-3-methoxyphenoxy)-2-butanol,
2-(2-amino-3-methoxyphenoxy)-1-phenylethanol,
2-(2-amino-4-methoxyphenoxy)ethanol,
1-(2-amino-4-methoxyphenoxy)-2-propanol,
1-(2-amino-4-methoxyphenoxy)-2-butanol,
2-(2-amino-4-methoxyphenoxy)-1-phenylethanol,
2-(2-amino-6-methoxyphenoxy)ethanol,
1-(2-amino-6-methoxyphenoxy)-2-propanol,
1-(2-amino-6-methoxyphenoxy)-2-butanol,
2-(2-amino-6-methoxyphenoxy)-1-phenylethanol,
2-(3-aminophenoxy)ethanol,
1-(3-aminophenoxy)-2-propanol,
1-(3-aminophenxoy)-2-butanol,
2-(3-aminophenoxy)-1-phenylethanol,
2-(3-amino-2-methylphenoxy)ethanol,
1-(3-amino-2-methylphenoxy)-2-propanol,
1-(3-amino-2-methylphenoxy)-2-butanol,
2-(3-amino-2-methylphenoxy)-1-phenylethanol,
2-(3-amino-4-methylphenoxy)ethanol,
1-(3-amino-4-methylphenoxy)-2-propanol,
1-(3-amino-4-methylphenoxy)-2-butanol,
2-(3-amino-4-methylphenoxy)-1-phenylethanol,
2-(3-amino-5-methylphenoxy)ethanol,
1-(3-amino-5-methylphenoxy)-2-propanol,
1-(3-amino-5-methylphenoxy)-2-butanol,
2-(3-amino-5-methylphenoxy)-1-phenylethanol,
2-(3-amino-2-methoxyphenoxy)ethanol,
1-(3-amino-2-methoxyphenoxy)-2-propanol,
1-(3-amino-2-methoxyphenoxy)-2-butanol,
2-(3-amino-2-methoxyphenoxy)-1-phenylethanol,
2-(3-amino-4-methoxyphenoxy)ethanol,
1-(3-amino-4-methoxyphenoxy)-2-propanol,
1-(3-amino-4-methoxyphenoxy)-2-butanol,
2-(3-amino-4-methoxyphenoxy)-1-phenylethanol,
2-(3-amino-5-methoxyphenoxy)ethanol,
1-(3-amino-5-methoxyphenoxy)-2-propanol,
1-(3-amino-5-methoxyphenoxy)-2-butanol,
2-(3-amino-5-methoxyphenoxy)-1-phenylethanol,
2,5-bis(2-hydroxyethoxy)aniline,
2,3-bis(2-hydroxyethoxy)aniline,
2,6-bis(2-hydroxyethoxy)aniline,
3,5-bis(2-hydroxyethoxy)aniline,
2,5-bis(2-hydroxypropoxy)aniline,
2,3-bis(2-hydroxypropoxy)aniline,
2,6-bis(2-hydroxypropoxy)aniline,
3,5-bis(2-hydroxypropoxy)aniline,
2,5-bis(2-hydroxybutoxy)aniline,
2,3-bis(2-hydroxybutoxy)aniline,
2,6-bis(2-hydroxybutoxy)aniline,
3,5-bis(2-hydroxybutoxy)aniline,
2,5-bis(2-hydroxy-2-phenylethoxy)aniline,
2,3-bis(2-hydroxy-2-phenylethoxy)aniline,
2,6-bis(2-hydroxy-2-phenylethoxy)aniline,
3,5-bis(2-hydroxy-2-phenylethoxy)aniline,
2-hydroxy-3-(2-aminophenoxy)propanol,
2-hydroxy-3-(2-amino-3-methylphenoxy)propanol,
2-hydroxy-3-(2-amino-4-methylphenoxy)propanol,
2-hydroxy-3-(2-amino-6-methylphenoxy)propanol,
2-hydroxy-3-(2-amino-3-methoxyphenoxy)propanol,
2-hydroxy-3-(2-amino-4-methoxyphenoxy)propanol,
2-hydroxy-3-(2-amino-6-methoxyphenoxy)propanol,
2,3-bis(2,3-dihydroxypropoxy)aniline,
2,6-bis(2,3-dihydroxypropoxy)aniline,
3,5-bis(2,3-dihydroxypropoxy)aniline, 2,5-bis(2,3-dihydroxypropoxy)aniline,
3-(2-aminophenoxy)-2-hydroxypropanol,
3-(2-amino-4-methylphenoxy)-2-hydroxypropanol, and
3-(2-amino-4-methoxyphenoxy)-2-hydroxypropanol.

Insofar as we have been able to determine, many of the foregoing Structure II phenylamines have not heretofore been used as intermediates in the making of disazo dyes. Some in their own right are new and novel compounds. These phenyl amines may be synthesized by alkylating an appropriately substituted nitrophenol with a suitable alkylene oxide or alkylene chlorohydrin, followed by reduction of the nitro group to form the free primary amine, or by alkylating an appropriately substituted acetamidophenol with a suitable alkylene oxide or alkylene chlorohydrin, followed by acid hydrolysis to form the free primary amine (see, e.g., *Chemical Abstracts*, 51, 8724a-b).

Suitable phenols for use in producing the new Structure Ia compounds include, but are not limited to: phenol, 2-methylphenol, 3-methylphenol, 4-methylphenol, 2-methoxyphenol, 3-methoxyphenol, 4-methoxyphenol, 2-chlorophenol, 3-chlorophenol, 4-chlorophenol, di-lower-alkyl phenols, lower alkyl chlorophenols, di-lower-alkoxy phenols, and lower alkoxy chlorophenols.

Suitable "end capping" reagents for making the new Structure Ib compounds include, but are not limited to, dimethyl sulfate, diethyl sulfate, methyl chloride, methyl bromide, methyl iodide, ethylene oxide, ethyl chloride, ethyl bromide, ethyl iodide, propylene oxide, 1-chloro-2-propanol, butylene oxide, styrene oxide, ethylene chlorohydrin, propylene chlorohydrin, butylene chlorhydrin, glycidol, glycerol monochlorohydrin, methane sulfonyl chloride, benzene sulfonyl chloride, toluene sulfonyl chloride, and chlorobenzene sulfonyl chloride.

Of the Structure I compounds, those that have the Structure Ic

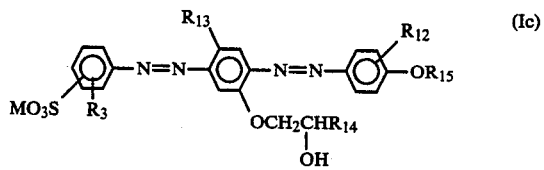

(Ic)

wherein
$R_{12}$ is —H or —CH$_3$; $R_{13}$ is —H or —CH$_3$;
$R_{14}$ is —H, —CH$_3$, or —CH$_2$CH$_3$; and
$R_{15}$ is —CH$_3$, —CH$_2$CH$_3$, —CH$_2$CH$_2$OH,

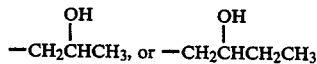

are especially well-suited for use in accordance with this invention. The Structure Ic compounds can be inexpensively made and exhibit outstanding working and fastness properties.

Depending on the particular solubility characteristics desired, the Structure I compounds can be made as the sodium, potassium, lithium, or —N(R$_5$)$_4$ salt forms (such as the ammonium, alkanolammonium and polyalkanolammonium salts) by various well-known techniques, which involve having the desired M ion or ions present during the various coupling and/or neutralization reactions employed in making the compound. The alkali metal ions may be provided by their hydroxides, carbonates, bicarbonates and the like. The ammonium, alkanolammonium, and polyalkanolammonium ions can be provided by the use of ammonia, alkanolamines and polyalkanolamines. Examples of suitable alkanolamines and polyalkanol amines include mono-, di- and triethanolamines; mono-, di- and tripropanolamines; mono-, di- and tributanolamines; and their ethoxylated, propoxylated and butoxylated derivatives, as well as mixtures of these derivatives. Amines from which such salts are derived may be readily prepared by reacting ammonia, mono-, di- or trialkanolamines with ethylene oxide, propylene oxide, butylene oxide or mixtures thereof. Any of the salt forms can be converted to their free acids by treatment in a conventional manner with a strong acid and filtering; the free acid can be converted to any of the various salts by neutralization with a suitable base.

The sodium, lithium, ammonium and triethanolammonium salts and the trisethoxylated-triethanolammonium salts having the structure:

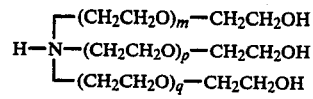

where
m, p, and q are 0, 1, 2 or 3 and
$m+p+q=3$
are the preferred salt forms because of economic considerations and the solubility properties imparted thereby.

The Structure I compounds impart orange hues to polyamide fibers from aqueous dye baths, and because of their "compatibility" with certain acid red dyes and certain acid blue dyes that are readily available and widely used in the dyeing of polyamide textile fibers, they are well-suited for use in combination or trichromatic dye systems for the dyeing of synthetic polyamide fibers (particularly synthetic polyamide carpeting) that enable various hues and shades to be obtained by varying the concentration of two or three different colored dye components-one being a red dye component, one being a blue dye component, and one being a yellow dye component.

In compound dye systems, in addition to imparting the usual desirable fastness properties (such as wet fastness, light fastness and stability to deleterious atmospheric gases), it is essential that the various dye components used in the system be compatible from a performance standpoint. Specifically, the color components should possess substantially the same aqueous solution stability, substantially the same dyeing rates, and substantially the same migration characteristics, so as to provide uniform strike, exhaustion and build-up under the particular time and temperature conditions encountered in the dyeing operation (usually from room temperature to 100° C.). Color components meeting these characteristics permit the desired hue to build up uniformly "on tone" and enable the dyer to have good control over the dyeing process at all stages thereof.

As used in this application, and unless a contrary intent is evident from the context, the term "dyeing" is used in its broadest sense, to cover the coloring of the fiber by the application of a color component from an aqueous solution, and includes coloration by printing with aqueous print pastes as well as by conventional dyeing techniques. In addition, the terms "yellow dye" or "yellow color component" are used to include compounds that are sold commercially as yellow dyes and as orange dyes and include the compounds of this invention.

Of the thousands of known acid dyes that are capable of dyeing synthetic polyamide fibers, relatively few dye combinations have the requisite compatibility from a performance standpoint to enable their effective use in trichromatic systems for dyeing synthetic polyamide fibers from aqueous dye baths, so as to provide uniform strike, buildup, and exhaustion of color during the dyeing operation and to reproduce repetitively uniform dyeings. The finding and selecting of compatible red, yellow, and blue dyes is also greatly aggravated because, under the present state of the art, persons skilled in the art cannot with certainty predict the degree to which structural alterations of a dye will influence a dye's performance, nor can they predict with certainty how a incompatible dye should be structurally modified to render it compatible with the other color component or components of the system.

Accordingly, one of the primary objectives of the present invention is to provide a new and relatively inexpensive group of azo compounds (i.e., the aforementioned Structure I compounds) that are capable of functioning as acid dyes for polyamide fibers, imparting orange hues thereto when applied from aqueous dyebaths.

It is also an objective of the present invention to provide a new system of compatible dyes that includes an acid red dye component, an acid blue dye component, and an acid yellow dye component that can be used in rapid, continuous dyeing applications where readily controlled dyeing is desired, such as in continuous printing, foam dyeing and spray dyeing of carpets, and particularly in applications where high-speed, computer-controlled equipment is employed.

It is a further objective of the invention to provide such a system that can also be used in exhaust dyeing, such as in becks.

It is a still further objective of the invention to provide new trichromatic dye systems which utilize the new orange compounds of this invention as the acid yellow dye components and which, from selectively within the group of new orange compounds, provide performance compatibility that permits use in trichromatic dye systems having different strike rates.

Because of their somewhat different performance properties, particularly their strike rates, the Structure I compounds wherein $R_1$ is a lower alkyl group (such as —CH$_3$ or —CH$_2$CH$_3$) and those wherein $R_1$ is a alkanol group (such as $$-CH_2CH_2OH, -CH_2CHC_6H_5, -CH_2CHCH_3 \text{ and}$$
$$\qquad\qquad\qquad\quad | \qquad\qquad\quad |$$
$$\qquad\qquad\qquad\ \ OH \qquad\qquad\ \ OH$$

$$-CH_2CHCH_2CH_3)$$
$$\quad\ \ |$$
$$\ \ OH$$

are not uniformly compatible with the same acid blue dyes and the same acid red dyes in trichromatic dyeing systems.

The Structure Ic dyes in which $R_{15}$ is a lower alkyl group are faster-striking than those in which $R_{15}$ is an alkanol group, the remainder of the molecules being identical. Thus, where $R_{15}$ in a Structure Ic compound is —CH$_3$ or —CH$_2$CH$_3$ (a subgroup hereinafter identified as $R_8$), the compounds of Structures Id and Ie

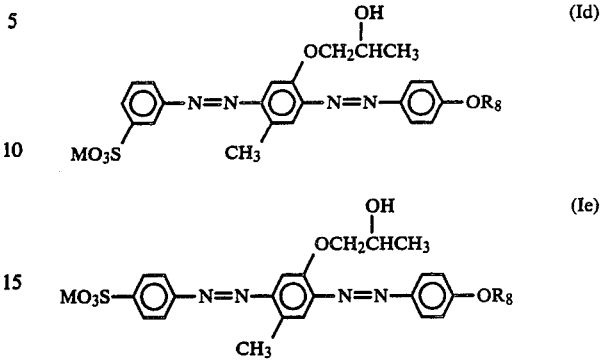

are compatible in performance with the faster-striking acid red dyes, such as

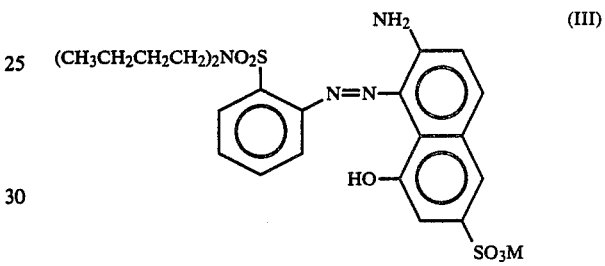

and the faster-striking blue dyes, such as

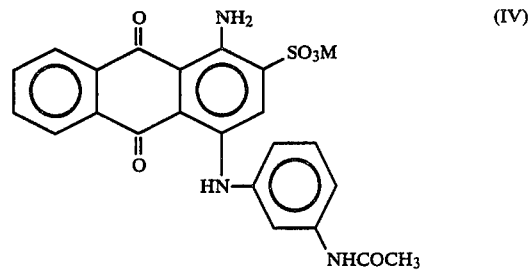

The Structure Ic compounds identical to the above dyes of Structures Id and Ie, with the exception that $R_{15}$ is one of the alkanol substituents (hereinafter $R_9$ substituents) specified in Structure Ic,

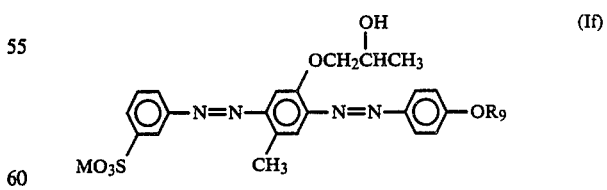

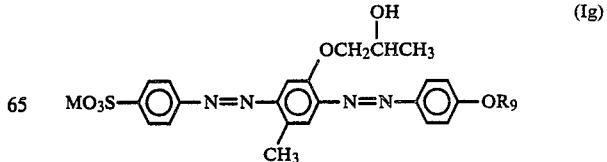

exhibit a comparatively slower rate of strike and are better suited for use with slower-striking acid red dyes, such as

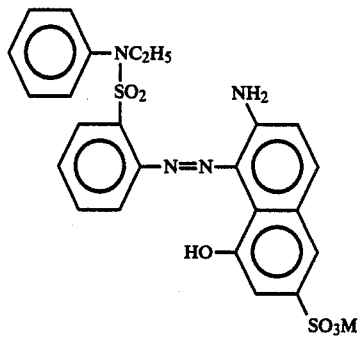

and slower-striking acid blue dyes, such as

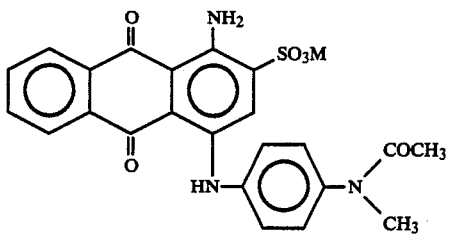

Thus, by varying the structure of the compounds of this invention, it is possible to make orange dye components that have very desirable working properties and which exhibit a wide range of strike rates, so that they can be used in trichromatic systems in which the dyes will be compatible in performance with desired acid red and acid blue dye combinations.

As is generally known in the art, the water solubility of an acid dye may vary according to the identity of the M substituent. Usually when M is alkanolammonium or polyalkanolammonium, the dye possesses greater water solubility than when M is an alkali metal. The alkanolammonium or polyalkanolammonium salt forms can be advantageously employed when storage-stable, high-concentration aqueous liquid forms of the dyes are to be produced.

The concentrations of the color components in the trichromatic system can be varied in a conventional manner in order to develop the desired hue in the dyeing.

The following examples will serve to describe the preparation of the Structure I compounds, demonstrate the compatibility of the color components used in the trichromatic dye systems of the invention, and illustrate the use of said systems in the dyeing of polyamide carpet fibers. In the examples, parts and percentages are by weight and temperatures are given in degrees Centigrade, unless otherwise stated.

EXAMPLE 1

A solution of 17.3 parts of sulfanilic acid in 4 parts of sodium hydroxide and 100 parts of water was diazotized directly at 0°–5° C. in the usual, known manner by adding 25 parts of concentrated hydrochloric acid followed by 7 parts of sodium nitrite dissolved in 20 parts of water. After addition of sulfamic acid to remove the slight excess of nitrous acid, the diazo slurry was added to a cold (10° C.) solution of 18.1 parts of 1-(2-amino-4-methylphenoxy)-2-propanol in 100 parts of water and 12 parts of concentrated hydrochloric acid. Sodium hydroxide solution was slowly added to raise and maintain the pH in the range 4.0–4.5 until the coupling was complete. After acidification with 25 parts of concentrated hydrochloric acid, the slurry was treated with 7 parts of sodium nitrite dissolved in 20 parts of water. After stirring at 30°–35° C. for two hours, the crystalline diazonium salt was isolated by filtration, and the filter cake was added to a cold (5° C.) solution of 10.6 parts of 85% phenol, 6 parts of sodium hydroxide, and 100 parts of water. The so-formed compound in the reaction mass was of the structure

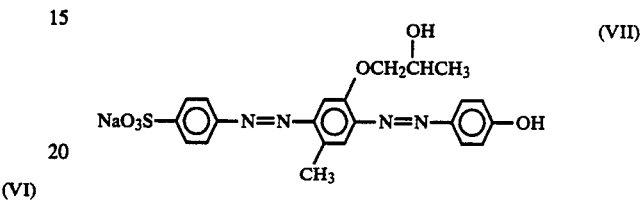

After two hours the pH of the reaction mass was adjusted to 11 with sodium hydroxide solution, and 35 parts of diethylsulfate were added dropwise while the temperature of the reaction mixture was maintained in the range 50°–55° C.

Upon completion of ethylation, the dye was precipitated by addition of 50 parts of sodium chloride. Filtration and drying yielded 45 parts of an orange, water-soluble powder having the structure

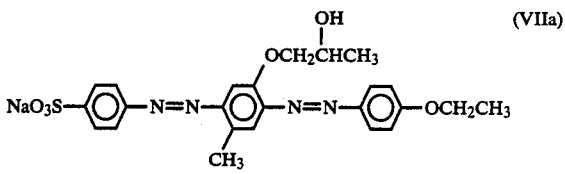

This compound dyed nylon carpet fibers from aqueous dyebaths in bright orange shades having excellent light fastness.

EXAMPLE 2

Metanilic acid (17.3 parts) was dissolved in 100 parts of water by addition of 4 parts of sodium hydroxide and diazotized directly at 0°–5° C. in the usual, known manner by adding 25 parts of concentrated hydrochloric acid followed by 7 parts of sodium nitrite dissolved in 20 parts of water. Following decomposition of the slight excess of nitrous acid by addition of sulfamic acid, the diazo slurry was added to a cold (10° C.) solution of 18.1 parts of 1-(2-amino-4-methylphenoxy)-2-propanol in 100 parts of water and 12 parts of concentrated hydrochloric acid. Sodium hydroxide solution was slowly added to raise and maintain the pH in the range 4.0–4.5 until coupling was complete. The slurry was acidified with 25 parts of concentrated hydrochloric acid and then treated with a solution of 7 parts of sodium nitrite dissolved in 20 parts of water.

The precipitated diazonium salt was isolated by filtration after stirring at 30°–35° C. for two hours. The filter cake obtained was added to a cold (5° C.) solution of 10.6 parts of 85% phenol in 100 parts of water and 6 parts of sodium hydroxide. After two hours stirring, the pH was adjusted to 9.2 with hydrochloric acid, and 15 parts of propylene oxide were added. The mixture was heated to and maintained at gentle reflux for four hours. The resulting solution was treated with 1 part diatomaceous earth as a filter aid and filtered.

Spray drying of the filtrate yielded 40 parts of a dark orange, water-soluble powder having the structure

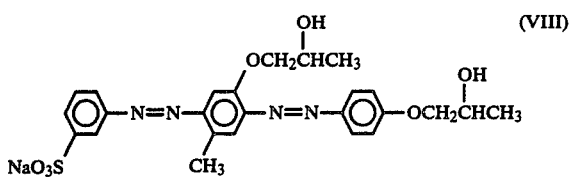

This powder dyed nylon carpet fibers from aqueous dyebaths in bright orange shades having excellent light fastness.

EXAMPLES 3-12

The dyes of Examples 3-12, summarized in the following table, were prepared as their sodium salts by procedures similar to those described in the preceding examples. The position and identity of the various substituents refer to groups identified in Structure Ie.

All of the resulting dyes colored nylon carpet fibers from aqueous dyebaths in bright orange shades having excellent light fastness.

| EXAMPLE | POSITION OF $MO_3S$— | $R_{14}$ | $R_{15}$ | $R_{12}$ | $R_3$ | $R_{13}$ |
|---|---|---|---|---|---|---|
| 3 | 3 | —$CH_3$ | —$CH_2CH_3$ | —H | —H | —$CH_3$ |
| 4 | 3 | —$CH_3$ | —$CH_3$ | —H | —H | —$CH_3$ |
| 5 | 4 | —$CH_3$ | —$CH_3$ | —H | —H | —$CH_3$ |
| 6 | 4 | —$CH_3$ | —$CH_2\overset{OH}{\underset{|}{C}}HCH_3$ | —H | —H | —$CH_3$ |
| 7 | 3 | —$CH_3$ | —$CH_2\overset{OH}{\underset{|}{C}}HCH_2CH_3$ | —H | —H | —$CH_3$ |
| 8 | 4 | —$CH_3$ | —$CH_2\overset{OH}{\underset{|}{C}}HCH_2CH_3$ | —H | —H | —$CH_3$ |
| 9 | 4 | —H | —$CH_2CH_3$ | —H | —H | —$CH_3$ |
| 10 | 4 | —H | —$CH_2\overset{OH}{\underset{|}{C}}HCH_2CH_3$ | —H | —H | —$CH_3$ |
| 11 | 4 | —H | —$CH_3$ | —H | —H | —$CH_3$ |
| 12 | 4 | —H | —$CH_2\overset{OH}{\underset{|}{C}}HCH_3$ | —H | —H | —$CH_3$ |

EXAMPLE 13

A dyebath was prepared containing the following:

| Structure III | red dye | (M=Na) | 2.5 grams |
|---|---|---|---|
| Structure IV | blue dye | (M=Na) | 1.0 grams |
| Structure VIIa | yellow dye | (M=Na) | 1.5 grams |

In addition, the bath contained 10.0 grams of the sodium salt of dioctylsulfosuccinate as a wetting agent, 5.0 grams of the tetrasodium salt of ethylenediaminetetraacetic acid as a sequestrant, 5.0 grams of an alkyl arylethersulfonate as a levelling agent, and 750 grams of a 1% solution of a synthetic, acid-hydrating guar gum. The bath was diluted to a total volume of 5.0 liters and the pH adjusted to 6.5 with acetic acid. It was then charged to a Kusters Continuous Application Roll Lab Carpet Dyeing Unit.

A 40-ounce sample of 100% nylon 6.6 Saxony carpet having a synthetic backing was impregnated with the above-described dye liquor at a running speed equivalent to 5 yards per minute. It was then squeezed out at a squeeze roll pressure of 10 p.s.i. to 400% liquor take-up, calculated on the dry weight of the carpet. The sample was subjected to steam at 212° F. for 6 minutes, rinsed with cold water and dried.

A level-dyed carpet of medium brown shade having excellent fastness to light and atmospheric gases was obtained.

EXAMPLE 14

A dyebath was prepared containing the following:

| Structure V | red dye | (M=Na) | 3.0 grams |
|---|---|---|---|
| Structure VI | blue dye | (M=Na) | 1.25 grams |
| Structure VIII | yellow dye | (M=Na) | 4.0 grams |

In addition, the bath contained 10.0 grams of the sodium salt of dioctylsulfosuccinate as a wetting agent, 5.0 grams of the tetrasodium salt of ethylenediaminetetraacetic acid as a sequestrant, 2.5 grams of an alkyl arylethersulfonate as a levelling agent, and 750 grams of a 1% solution of a synthetic, acid-hydrating guar gum. The bath was diluted to a total volume of 5.0 liters and the pH adjusted to 8.0 with disodium phosphate. It was then charged to a Kusters Continuous Application Roll Lab Carpet Dyeing Unit.

A pre-wetted 40-ounce sample of 100% nylon 6 Saxony carpet having a synthetic backing was impregnated at 400% wet pick-up with the above-described dye liquor at a running speed equivalent to 5 yards per minute. The sample was then exposed to steam at 100° C. for 6 minutes, rinsed with cold water and dried.

A level-dyed carpet of medium brown shade having excellent fastness to light and atmospheric gases was obtained.

We claim:

1. A compound of the formula:

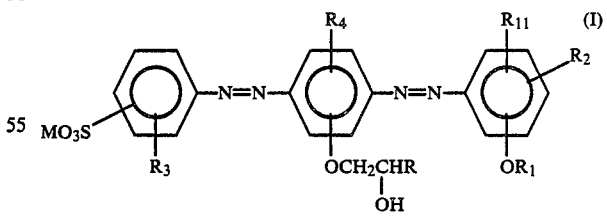

wherein

R is —H, —$CH_3$, —$CH_2CH_3$, —$C_6H_5$, or —$CH_2OH$;
$R_1$ is —H or $R_{16}$, wherein
$R_{16}$ is —$CH_3$, —$CH_2CH_3$, —$CH_2CH_2OH$,

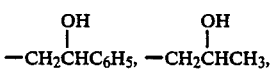

-continued

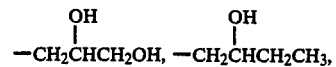

—SO₂ lower alkyl, —SO₂ phenyl, or —SO₂ phenyl substituted with one or more halo, lower alkyl, or lower alkoxy groups;

R₂ is —H, -lower alkyl, -lower alkoxy, or —Cl;
R₃ is —H, -lower alkyl, -lower alkoxy, or —Cl;
R₄ is —H, —CH₃, —CH₂CH₃, or

R₁₁ is —H or -lower alkyl;
M is —H, —Li, —Na, —K, NH₄, or —N(R₅)₄, wherein
R₅ is —H or

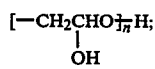

R₆ is —H, —CH₃, or —CH₂CH₃;
n is 1, 2, 3, or 4; and
OR₁ is ortho to the azo, a substituent selected from the group lower alkyl, -lower alkoxy, or —Cl must be present para to the OR₁ group.

2. A compound according to claim 1 having the structure:

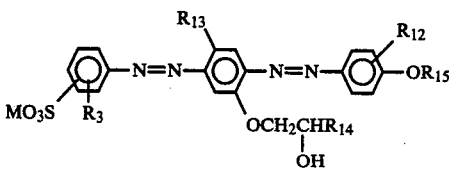

(Ic)

wherein
M and R₃ have the same meanings as in claim 1;
R₁₂ is —H or —CH₃;
R₁₃ is —H or —CH₃;
R₁₄ is —H, —CH₃; and
R₁₅ is —CH₃, —CH₂CH₃, —CH₂CH₂OH,

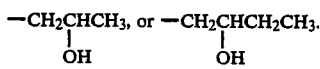

3. A compound according to claim 2 having the structure:

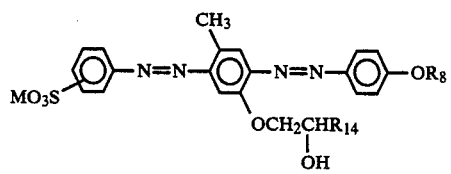

wherein M and R₁₄ have the same meanings as in claim 4 and R₈ is —CH₃ or —CH₂CH₃.

4. A compound according to claim 2 having the structure:

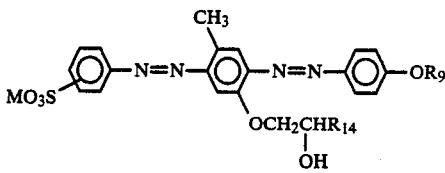

wherein M and R₁₄ have the same meanings as in claim 4 and R₉ is —CH₂CH₂OH,

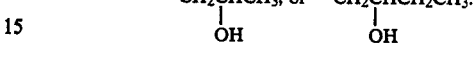

5. A compound according to claim 2 having the structure:

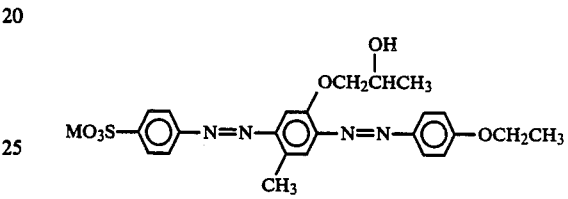

wherein M has the same meanings as in claim 2.

6. A compound according to claim 2 having the structure:

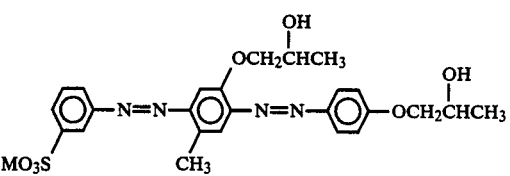

wherein M has the same meanings as in claim 2.

7. A compound according to claim 2 having the structure:

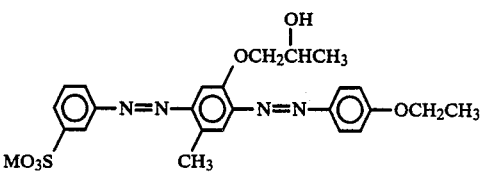

wherein M has the same meanings as in claim 2.

8. A compound according to claim 2 having the structure:

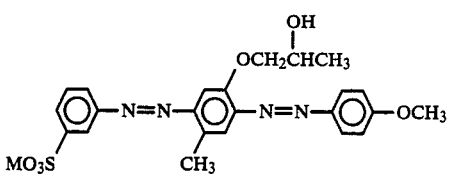

wherein M has the same meanings as in claim 2.

9. A compound according to claim 2 having the structure:

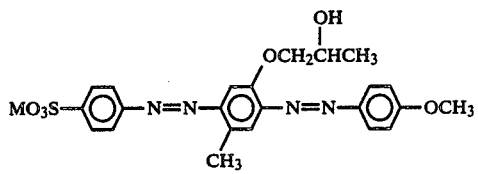

wherein M has the same meanings as in claim 2.

10. A compound according to claim 2 having the structure:

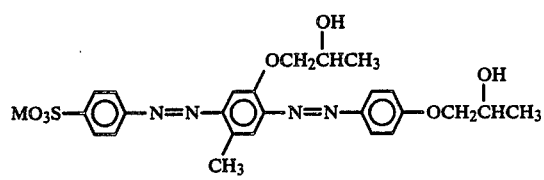

wherein M has the same meanings as in claim 2.

11. A compound according to claim 2 having the structure:

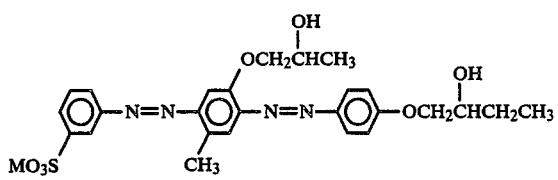

wherein M has the same meanings as in claim 2.

12. A compound according to claim 2 having the structure:

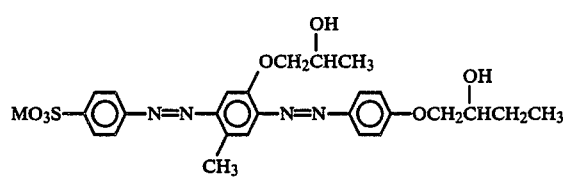

wherein M has the same meanings as in claim 2.

13. A compound according to claim 2 having the structure:

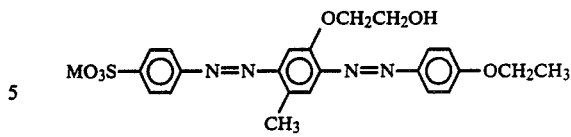

wherein M has the same meanings as in claim 2.

14. A compound according to claim 2 having the structure:

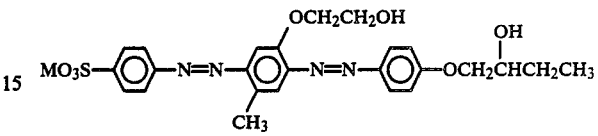

wherein M has the same meanings as in claim 2.

15. A compound according to claim 2 having the structure:

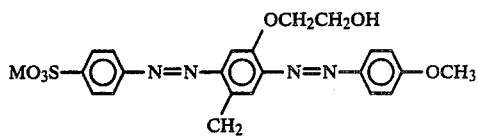

wherein M has the same meanings as in claim 2.

16. A compound according to claim 2 having the structure:

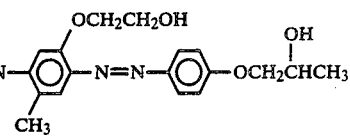

wherein M has the same meanings as in claim 2.

17. A compound according to claim 1 wherein M is

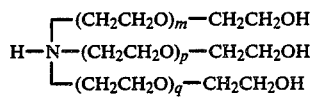

wherein
m, p, and q are 0, 1, 2, or 3 and
$m+p+q=3$.

18. A composition of matter comprising an aqueous solution containing a compound according to claim 1 as the sole color component or together with at least one dye selected from the group consisting of a compatible acid red dye, a compatible acid blue dye, and a compatible acid red dye and a compatible acid blue dye.

* * * * *